United States Patent
Hewitt et al.

(10) Patent No.: US 8,758,149 B1
(45) Date of Patent: Jun. 24, 2014

(54) ELASTOMERIC COUPLING HAVING CLAMP RING WITH FLANGES PROVIDING TORSIONAL STIFFNESS CHARACTERISTICS

(71) Applicant: Baldor Electric Company, Fort Smith, AR (US)

(72) Inventors: William Gregory Hewitt, Taylors, SC (US); Donald L. Nisley, Greenville, SC (US)

(73) Assignee: Baldor Electric Company, Fort Smith, AR (US)

( * ) Notice: Subject to any disclaimer, the term of this patent is extended or adjusted under 35 U.S.C. 154(b) by 0 days.

(21) Appl. No.: 13/707,065

(22) Filed: Dec. 6, 2012

(51) Int. Cl.
*F16D 3/74* (2006.01)

(52) U.S. Cl.
USPC .................. 464/88; 264/274; 264/DIG. 67

(58) Field of Classification Search
CPC ......... F16D 3/72; F16D 3/74; B29K 2705/00; B29C 45/14311
USPC ............ 464/80, 88; 264/271.1, 274, DIG. 64, 264/DIG. 67; 403/223; 285/229
See application file for complete search history.

(56) References Cited

U.S. PATENT DOCUMENTS

| | | |
|---|---|---|
| 1,501,187 A | 7/1924 | Rayfield |
| 3,524,332 A | 8/1970 | Callies |
| 3,678,707 A * | 7/1972 | Ulics ............................. 464/88 |
| 3,702,545 A | 11/1972 | Schlotmann et al. |
| 3,982,408 A | 9/1976 | Wright |
| 4,220,180 A * | 9/1980 | Koga et al. ................ 285/229 X |
| 4,536,170 A | 8/1985 | Downey |
| 4,634,400 A | 1/1987 | Butzow et al. |
| 5,564,982 A | 10/1996 | Gipson et al. |
| 5,595,541 A | 1/1997 | Ducugnon |
| 5,611,732 A | 3/1997 | Tirumalai |
| 5,910,049 A | 6/1999 | DeWachter et al. |
| 5,911,629 A | 6/1999 | Reynolds |
| 6,117,015 A | 9/2000 | Ryan et al. |
| 6,196,926 B1 | 3/2001 | Goebel et al. |
| 6,257,985 B1 | 7/2001 | Ward et al. |
| 7,217,193 B2 | 5/2007 | Nisley |
| 7,390,265 B2 | 6/2008 | Smihal |
| 2006/0009297 A1 | 1/2006 | Hubiak et al. |

* cited by examiner

*Primary Examiner* — Gregory Binda
(74) *Attorney, Agent, or Firm* — Thompson Coburn LLP

(57) ABSTRACT

A coupling transmits torque between shafts approximately aligned on a shaft axis. The coupling has a center axis approximately aligned with the shaft axis and a center element formed from an elastomer material. The center element has first and second axial sides. A clamp ring extends axially from each side of the center element along the coupling center axis. The clamp rings may include slots for fasteners for mounting the coupling to shaft hubs. The clamp ring has a flange portion embedded within the center element. Each clamp ring flange portion extends substantially away from the coupling center axis within the center element. An amount of extension away from the coupling center axis is selected to provide the coupling with a desired torsional stiffness characteristic. In accordance with a method, the coupling is formed by selecting the flange portions that will provide the coupling with a desired torsional stiffness characteristic.

18 Claims, 5 Drawing Sheets

# ELASTOMERIC COUPLING HAVING CLAMP RING WITH FLANGES PROVIDING TORSIONAL STIFFNESS CHARACTERISTICS

BACKGROUND AND SUMMARY

This disclosure relates generally to elastomeric couplings for transmitting torque between two shafts approximately aligned on a shaft axis, i.e., elastomeric couplings joining a pair of axially spaced shafts. The coupling has clamp rings with flange portions that are encapsulated in or embedded in and fixed in the material comprising the elastomeric element. The flange portions have a geometry which imparts a torsional stiffness characteristic of the coupling.

DETAILED DESCRIPTION

Figure 1:
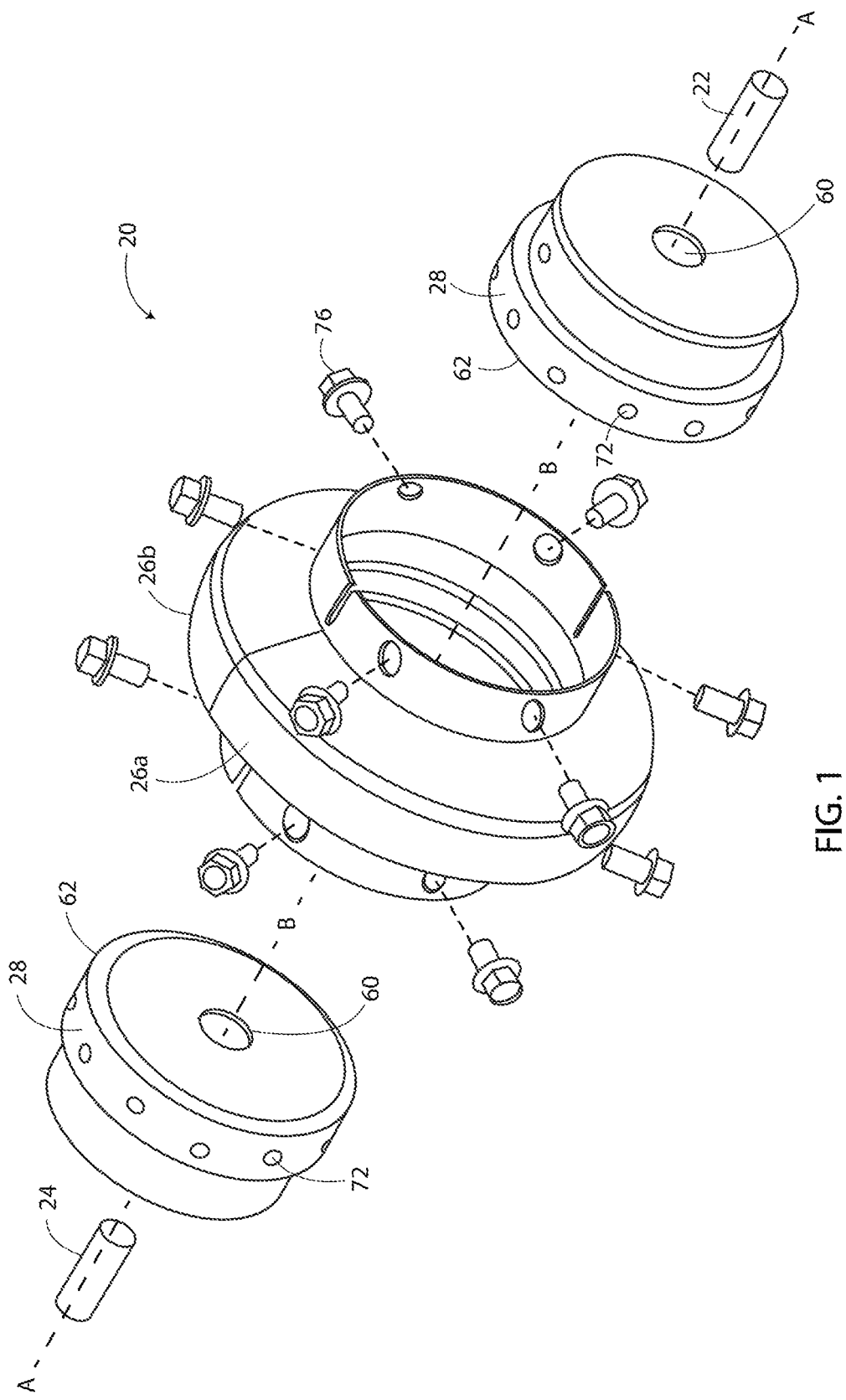
FIG. 1 illustrates a perspective exploded view of shaft hubs and a coupling.
Figure 2:
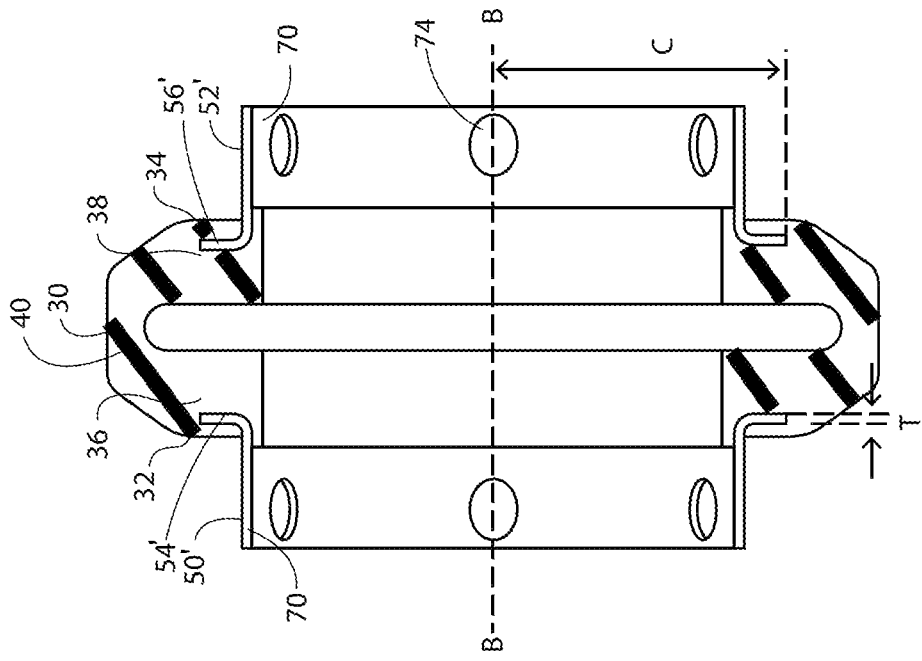
FIG. 2 illustrates a cross-sectional view of an embodiment of the coupling of FIG. 1.
Figure 3:
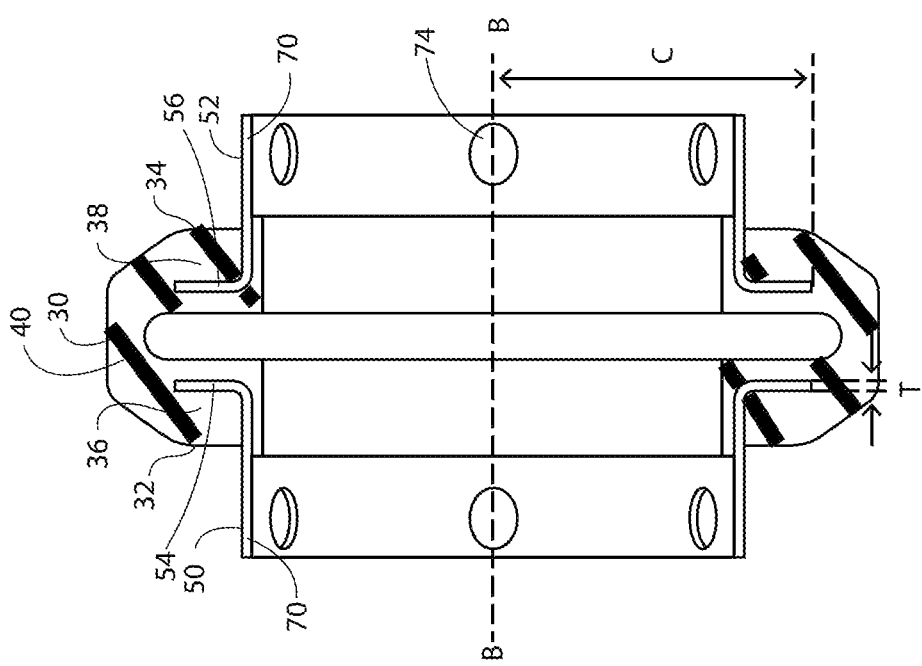
FIG. 3 illustrates a cross-sectional view of an alternate embodiment of the coupling of FIG. 1.
Figure 4:
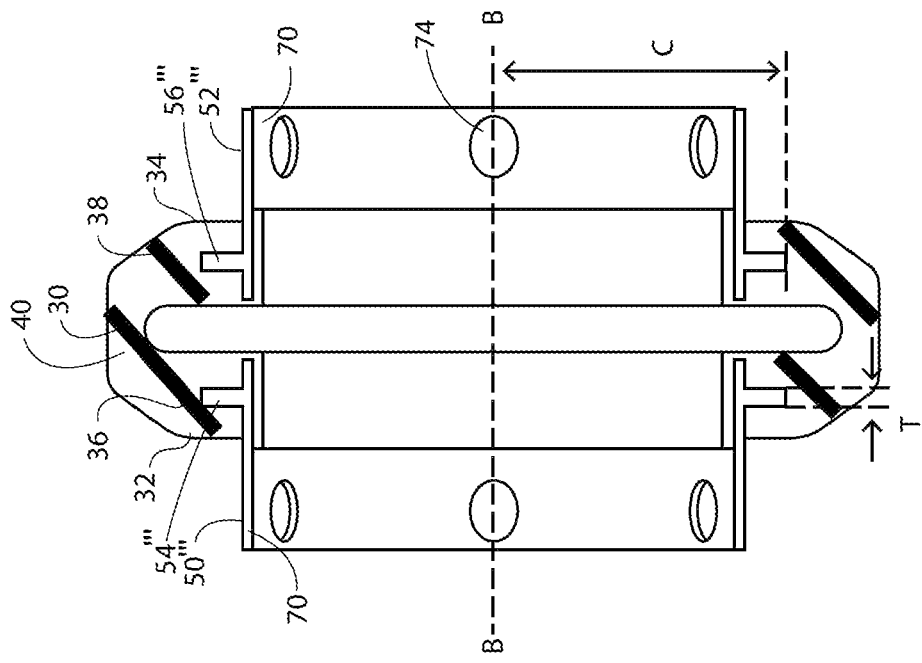
FIG. 4 illustrates a cross-sectional view of an alternate embodiment of the coupling of FIG. 1.
Figure 5:
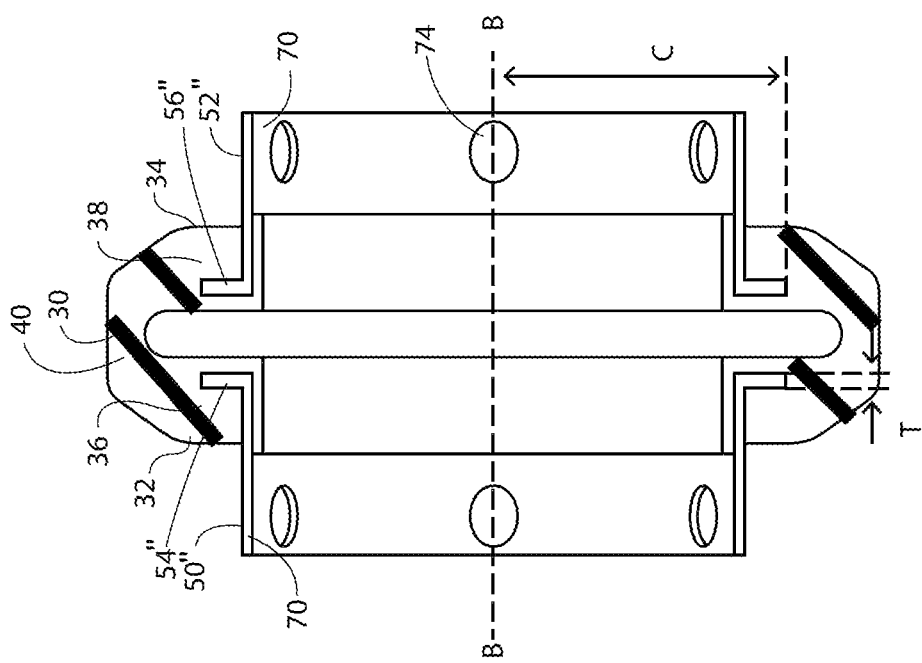
FIG. 5 illustrates a cross-sectional view of an alternate embodiment of the coupling of FIG. 1.

Referring to FIG. 1, an elastomeric coupling 20 for transmitting torque between two shafts 22,24 approximately aligned on a shaft axis A-A is shown. Preferably, the coupling comprises two semi-annular portions 26a,26b which are arranged about shaft hubs 28 to form the coupling 20 with a center axis B-B generally coinciding with the shaft axis A-A. Referring particularly to FIGS. 2-6, each semi-annular coupling portion 26a,26b comprises a center element 30 with first and second axially opposite sides 32,34. The center element 30 may have a first leg portion 36 forming the first axial side 32 and a second leg portion 38 forming the second axial side 34 with a bridging portion 40 extending between each leg portion 36,38 to form the coupling center element. Thus, the first and second portions legs of the center element are integrally connected by the bridging portion which is located in an axially spaced relation to the coupling center axis. The center element may be formed of any suitable elastomeric material, such as rubber, urethane, or their derivatives. Although the drawings show two coupling portions forming a coupling, the coupling may alternatively be formed as a single or integrated part. While the description that follows will discuss a coupling formed from two semi-annular coupling portions, the same principles may be employed to form a single or integrated coupling.

Figure 6:
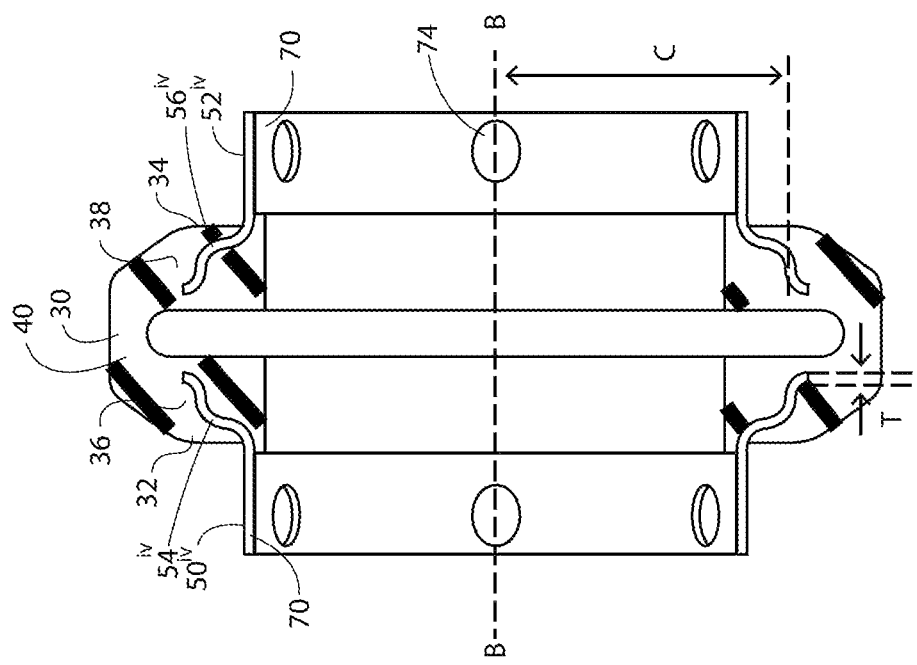
FIG. 6 illustrates a cross-sectional view of an alternate embodiment of the coupling of FIG. 1.
Figure 7:
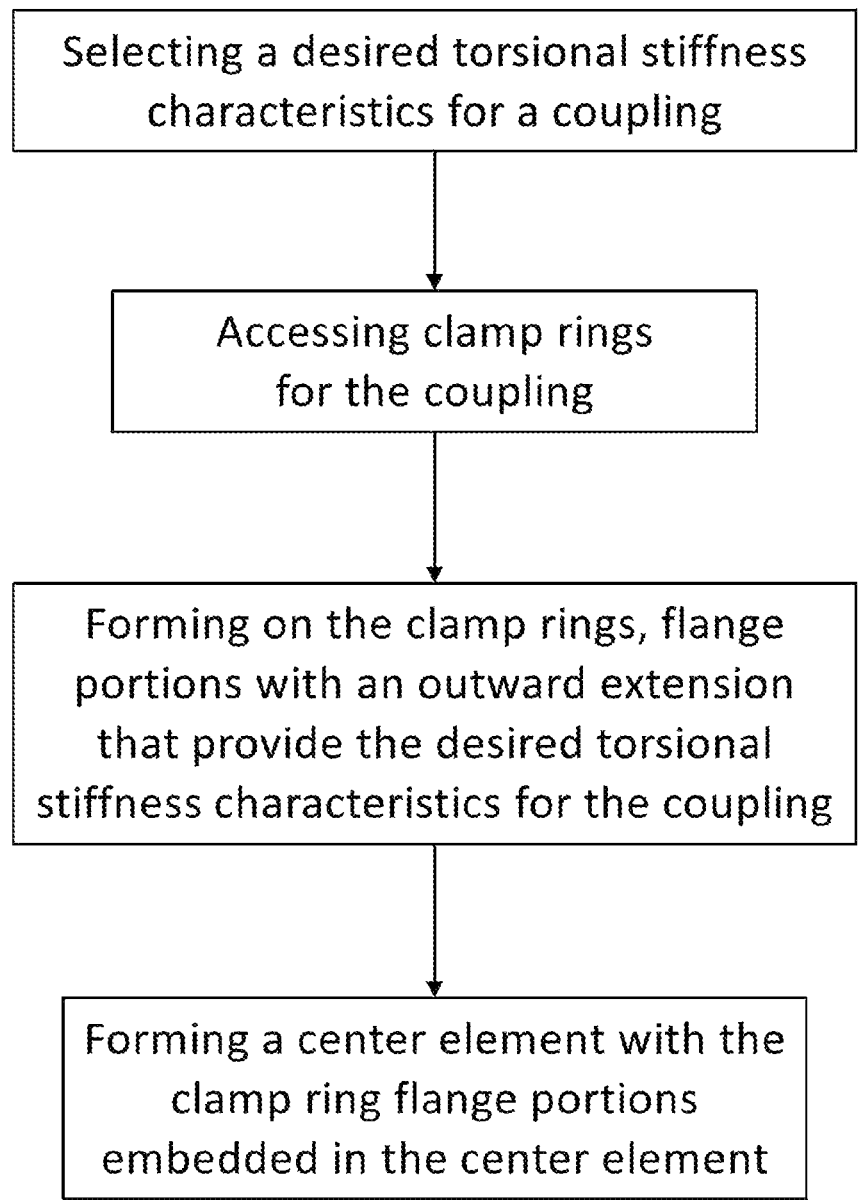
FIG. 7 shows a flowchart of a process for forming a coupling as shown in FIG. 1.

Each coupling portion has a clamp ring 50,52 extending from its side. When the coupling comprises a semi-annular portion, the clamp ring may also comprise semi-annular bodies. The clamp ring may be made from any rigid material such as steel, plastic, etc. When the center element is formed with first and second leg portions as shown in FIGS. 2-6, each clamp ring may extend axially from its respective leg portion along the coupling center axis. In FIGS. 2-6, reference numerals 50-56 have been indicated with superscript symbols ($^{I, II, III, IV}$) to indicate the similar features that are shown as modified in each of FIGS. 2-6. To simplify the description that follows, the symbols have been omitted. Each clamp ring 50,52 may have a flange portion 54,56 that may be embedded within center element. When the center element is formed with first and second leg portions, each clamp ring flange portion may be embedded in the respective leg portion of the center element. The flange portion 54,56 may be machined in the clamp ring or otherwise formed as an integral part of the clamp ring, through a swaging or punching operation. The flange portion may also be bonded, welded, or otherwise affixed to or deposited on the clamp ring. Each clamp ring flange portion 54,56 may extend substantially outward and away from the coupling center axis within the respective leg portion of the center element. For instance, the outward extension C may be perpendicularly away from the coupling center axis as shown in FIGS. 2-5. The outward extension may also be angled away from the coupling center axis as shown in FIG. 6. An amount of extension outward C of the clamp ring flange portion away from the coupling center axis is selected to provide the coupling with a desired torsional stiffness characteristic. The thickness T of the flange portion may also be selected to provide the coupling with a desired torsional stiffness characteristic. This will be described in greater detail below.

The first and second hubs 28 are generally identically constructed, are generally annular, and can be fabricated of any suitable generally rigid material, such as a metal. The first and second hubs 28 respectively include inner axial bores or surfaces 60 adapted to be respectively connected to, or engaged with, the first and second shafts 22,24. In addition, the first and second hubs respectively include outer cylindrical surfaces 62 which are respectively engaged by clamp rings of the coupling.

The coupling clamp rings 50,52 are adapted to connect with first and second hubs 28 of the shafts 22,24. The clamp rings 50,52 may surround the shaft hubs 28. For instance, each coupling portion may have a semi-annular shape and the respective clamp ring may be generally semi-annular with a semi-cylindrical shape. The outer cylindrical surfaces 62 of the hubs may engage with inner surfaces 70 of the clamp rings and may be engaged substantially throughout the outer surfaces of the hubs. By way of illustration, in a zero-clearance type of application where the shaft hubs cannot be moved along the shaft axis, a first semi-annular coupling portion may be mounted to a semi-annular portion of the shaft hubs and a second semi-annular coupling portion may be mounted to the remaining semi-annular portion of the shaft hubs. Where the shaft hubs may be repositioned along the shaft axis, a single, integrated coupling may be used and the shaft hubs may be repositioned along the shaft axis as necessary to allow installation of the coupling element. Although not shown in the drawings, the clamp rings may engage side faces of the hubs.

As shown in the drawings, to allow installation, the first and second hubs 28 also respectively include a plurality of holes 72 circumferentially spaced about their outer surfaces, and the clamp rings may have a plurality of holes 74 circumferentially spaced about the clamp rings. The hub fastener holes 72 correspond with the clamp ring holes 74, thereby allowing the clamp ring holes to be brought into register with the hub holes. The clamp rings may be secured to the shaft hubs by passing mechanical fasteners 76 through the clamp ring holes 74 and threading them into the shaft hub holes 72. Preferably, the holes 74 on the clamp rings are elongated or formed as slots to allow for clamp rings to be connected to the shaft hubs when there is misalignment therebetween. By providing elongated holes or slots when misalignment exists, the installer has the ability to align the fasteners through the clamp rings with the threaded holes in the hubs. Slots instead of clearance holes allows the fasteners to pass through the clamp rings slots and into the threaded holes of the hubs when there may be parallel and/or angular misalignment between the hubs. Although not shown in the drawings, pins or other fastener means may also be used to secure the clamp rings to the shaft hubs.

Each coupling portion (or in the case of a single integrated coupling) is preferably made by a resin transfer molding process. Resin may be injected into the mold to impregnate a glass fiber material to form the center element. The resin impregnated material may then be cured. The clamp rings may be fixed to the center element during the application of the resin material to the mold, upon curing, or upon subsequent to removal of the center element from the mold.

To allow for increased manufacturing flexibility, there is a need to achieve faster and more efficient changeover between production runs of couplings. In accordance with the disclosure, a manufacturer may be able to changeover between different production runs of couplings by merely changing the particular clamp ring and associated flange style used in the molding process. For instance, a torsional characteristic for a particular product may be selected by merely changing the style of the clamp ring flange portion. Accordingly, in one production run, various couplings with different torsional stiffness characteristic may be manufactured by merely selecting a clamp ring with a flange portion having the amount of surface area necessary in axial and radial directions, as applicable, to be embedded within and otherwise bonded to the center element. Thus, for a different coupling product with a different torsional stiffness, a different style clamp ring with flange portion geometry may be inserted into the same mold, and/or tooling, thereby allowing a coupling with a higher or lower torsional stiffness to be manufactured with minimal disruption to the manufacturing process through set-up or changeover. In other words, a different coupling product can be manufactured by varying the geometry of the clamping ring flange portion and without the need to modify the mold or elastomer compound, or other molds or tooling.

FIG. 2-6 show different arrangements of clamp ring flange portions. Altering the flange portion size, bond area location, and shape allows the manufacturer to change the torsional features of the coupling. When the bonding area flange portion is increased, the torsional stiffness of the coupling is increased. A higher torsional stiffness for a coupling may be seen as a benefit in an application where rotational lag between a motor and a driven load, for instance, during start-up, needs to be minimized. When the bonding geometry of the flange portion is decreased, the torsional stiffness of the coupling is decreased. A lower torsional stiffness for a coupling may be seen as a benefit in an application where the dampening effect of the coupling is important. Accordingly, for a given shape and size of a coupling, modifications to a mold or modifications to an elastomer material are not required, and various clamp ring flange geometries as illustratively shown in FIG. 2-6 may be used in the same mold to produce couplings with predictable and selectable amounts of torsional stiffness.

The embodiments were chosen and described in order to best explain the principles of the disclosure and their practical application to thereby enable others skilled in the art to best utilize said principles in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A coupling for transmitting torque between two shafts approximately aligned on a shaft axis, the coupling having a center axis approximately aligned with the shaft axis, the coupling comprising:
   a center element formed from an elastomer material, the center element having first and second axial sides; and
   a clamp ring having an attachment portion adapted to be attached to a shaft, the attachment portion extending axially from each side of the center element along the coupling center axis, the clamp ring having a flange portion embedded within the center element, each clamp ring flange portion having a radially extending part extending away from the clamp ring attachment portion in a direction substantially away from the coupling center axis within the center element such that the clamp ring flange portion radially extending part is perpendicular to the attachment portion and a distal end of the clamp ring flange portion is radially displaced from the clamp ring attachment portion, an amount of the clamp ring flange portion extension in a radial direction away from the coupling center axis and clamp ring attachment portion being selected to provide the coupling with a desired torsional stiffness characteristic.

2. The coupling of claim 1, wherein the clamp ring flange portion has a part that extends in an axial direction and is perpendicular to the clamp ring flange portion radially extending part.

3. The coupling of claim 1, wherein a thickness dimension of the clamp ring flange portion is selected to provide a desired torsional stiffness characteristic for the coupling.

4. A coupling for transmitting torque between two shafts approximately aligned on a shaft axis, the coupling having a center axis approximately aligned with the shaft axis, the coupling comprising:
   a center element formed from an elastomer material, the center element having first and second leg portions axial spaced from each other along the coupling center axis and a bridging portion extending between the leg portions; and
   first and second clamp rings each having an attachment portion adapted to be attached to a shaft, the attachment portion of each clamp ring extending axially from each leg portion of the center element along the coupling center axis, each clamp ring having a flange portion embedded within the respective leg portion of the center element, each clamp ring flange portion having a radially extending part extending away from its respective clamp ring attachment portion in a direction substantially outward from the coupling center axis within the respective leg portion of the center element such that the clamp ring flange portion radially extending part is perpendicular to the attachment portion and a distal end of the clamp ring flange portion is radially displaced from the clamp ring attachment portion, an amount of radial extension of the clamp ring flange portion outward from the coupling center axis and clamp ring attachment portion being selected to provide the coupling with a desired torsional stiffness characteristic.

5. The coupling of claim 4, wherein the clamp ring flange portion has a part that extends in an axial direction and is perpendicular to the clamp ring flange portion radially extending part.

6. The coupling of claim 4, wherein a thickness dimension of the clamp ring flange portion is selected to provide a desired torsional stiffness characteristic for the coupling.

7. The coupling of claim 4 wherein the clamp ring is adapted to fit around an outer diameter surface of a shaft hub when mounting the coupling to a shaft.

8. The coupling of claim 7 wherein the clamp ring is generally semi-cylindrical in shape.

9. The coupling of claim 4 wherein the clamp ring has circumferentially spaced slots.

10. The coupling of claim 9 wherein the center element comprises a semi-annular member.

11. A method comprising of forming a coupling:
selecting a desired torsional stiffness characteristic for the coupling
accessing first and second clamp rings for the coupling, the first and second clamp rings each having an attachment portion adapted to be attached to a shaft;
forming flange portions on each coupling clamp ring, each flange portion extending away from the respective clamp ring attachment portion in a direction substantially outward from a center axis of the clamp ring such that the clamp ring flange portion is generally transverse to the respective attachment portion and a distal end of the clamp ring flange portion is radially displaced from the respective clamp ring attachment portion, an amount of outward extension of the clamp ring flange portion away from the coupling center axis and clamp ring attachment portion being selected to provide the desired torsional stiffness characteristic for the coupling; and
from an elastomer material, forming a center element with first and second axial sides and with each clamp ring flange portion being embedded within the center element and extending from axially opposite side of the center element.

12. The method of claim 11 wherein the step of forming the center element includes forming the center element with a first leg portion on the first side and a second leg portion on the second side, each of the leg portions being axial spaced from each other along a coupling center axis with a bridging portion extending between the leg portions, and each leg portion having a respective clamp ring flange portion embedded therein.

13. The method of claim 12, wherein the clamp ring flange portion extends in a direction that is perpendicular to the coupling center axis.

14. The method of claim 13, wherein the clamp ring flange portion extends in an axial direction relative to the clamp ring.

15. The method of claim 11, wherein a thickness dimension of the clamp ring flange portion is selected to provide a desired torsional stiffness characteristic for the coupling.

16. The method of claim 11, wherein the clamp ring is generally cylindrical in shape.

17. The method of claim 16, wherein the clamp ring has circumferentially spaced slots.

18. The method of claim 17, wherein the center element comprises a semi-annular member.

* * * * *